(12) United States Patent
Brückmann et al.

(10) Patent No.: US 8,309,476 B2
(45) Date of Patent: Nov. 13, 2012

(54) WATER-DILUTABLE CONCENTRATES FOR THE COATING OF VARIOUS SUBSTRATES

(75) Inventors: Ralf Brückmann, Tübingen (DE);
Harald Lutz, Pliezhausen (DE);
Matthias Koch, Filderstadt (DE);
Hermann Schirra, Saarbrücken (DE);
Dirk Kreischer, Blieskastel (DE)

(73) Assignee: CHT R. Beitlich GmbH (DE)

( * ) Notice: Subject to any disclaimer, the term of this patent is extended or adjusted under 35 U.S.C. 154(b) by 755 days.

(21) Appl. No.: 12/301,514

(22) PCT Filed: May 22, 2007

(86) PCT No.: PCT/EP2007/054959
§ 371 (c)(1),
(2), (4) Date: Jan. 6, 2009

(87) PCT Pub. No.: WO2007/137971
PCT Pub. Date: Dec. 6, 2007

(65) Prior Publication Data
US 2010/0203312 A1    Aug. 12, 2010

(30) Foreign Application Priority Data
May 26, 2006 (DE) .......................... 10 2006 024 727

(51) Int. Cl.
*D06M 15/643* (2006.01)
*B32B 5/18* (2006.01)

(52) U.S. Cl. .......................................... 442/87; 252/8.61
(58) Field of Classification Search .................. None
See application file for complete search history.

(56) References Cited

U.S. PATENT DOCUMENTS

| 6,011,123 | A | * | 1/2000 | Kurosawa et al. | ............. 525/431 |
| 2004/0117915 | A1 | | 6/2004 | Xin et al. | |
| 2008/0111027 | A1 | * | 5/2008 | Blohowiak et al. | ............. 244/133 |
| 2010/0203312 | A1 | * | 8/2010 | Bruckmann et al. | ............. 428/221 |

FOREIGN PATENT DOCUMENTS

| DE | 197 56 906 A1 | 7/1999 |
| DE | 198 16 136 A1 | 10/1999 |
| DE | 100 63 519 A1 | 7/2002 |
| EP | 0 555 879 B1 | 8/1993 |
| EP | 0 844 283 B1 | 5/1998 |
| EP | 1 252 214 B1 | 10/2002 |
| WO | 92/21729 A1 | 12/1992 |
| WO | 03/093383 A1 | 11/2003 |
| WO | 2006/010388 A1 | 2/2006 |

* cited by examiner

*Primary Examiner* — Camie Thompson
(74) *Attorney, Agent, or Firm* — Clements Bernard PLLC; Gregory N. Clements

(57) ABSTRACT

The present invention relates to concentrated inorganic/organic sols that are readily diluted with water to form coating agents for textile materials. Further, the use of the aqueous formulations, especially for the washproof coating of a textile material.

15 Claims, No Drawings

WATER-DILUTABLE CONCENTRATES FOR THE COATING OF VARIOUS SUBSTRATES

The present invention relates to concentrated inorganic/organic sols that are readily diluted with water to form coating agents for textile materials. Further, the use of the aqueous formulations, especially for the washproof coating of a textile material.

In textile technology, among others, it is sought to improve the physical mechanical properties permanently by the after-treatment of textile materials by coating or finishing; in addition, the material is to be provided with new properties, such as improved soft touch, hydrophilicity, hydrophobicity, antimicrobial effectiveness, flame-retardant property or UV protection. These properties are achieved by the application of a wide variety of finishing agents.

The coating or finishing of a textile material, especially for the clothing field, is subjected to a permanent load, such as motion, friction or household laundering, to which each wear-resistant textile is subjected up to a hundred times. Household laundering is an extremely high load on the textile and the coating applied. A wash-proof coating or finishing must not be damaged by a swelling of the fiber, mechanical load or surfactants or alkali. Alkali resistance, which a wash-proof finishing must have, is particularly important, for in order to obtain as good a soil removal as possible during household laundering, a high pH value of the washing liquor is necessary. The soil and textile fiber are negatively charged, and the electrostatic repulsive forces are thus enhanced. In order to increase alkalinity, sodium carbonate is added to the detergent. Therefore, commercially available all-purpose detergents reach a pH value of 10 to 11 in the washing liquor. As generally known, many coatings are chemically attacked under such conditions and successively washed off. Specific chemical bonds, such as in ester linkages or silicon-oxygen bonds as found in silicone compounds, can be cleaved in an alkaline medium. A permanent coating should be uniform and cross-linked in a close-meshed way to avoid points of attack for the washing liquor. To ensure this, the coating agent must have a high number of cross-links. For this reason, educts having a high number of reactive groups that can undergo cross-linking with one another or reaction with a substrate are required for preparing such formulations.

As highly reactive cross-linking coating agents for glasses and polymeric plastics, sol-gel systems based on inorganic/organic composites are generally known. Sols employed for this purpose are mostly highly diluted solvent-based systems having a maximum solids content of 5 to 10%. From extended storage, addition of water, thermal load or concentration, the sols lose much of their stability and undergo transition into the gel state, which is no longer processable.

To date, such systems have not found access to the industrial scale in textile technology. This is due to the fact that almost all processes and machines in the textile industry are adapted to application from aqueous baths and application liquors, and thus systems with high alcohol or solvent contents are not employed.

This is due to the fact that drying and fixing are performed in non-explosion-proof plants, which are partly heated with an open flame, in almost all textile finishing plants. For this reason, it is mandatory to employ products that have an unproblematic flash point.

Usually, concentrates are diluted with water to reach their application concentration in the textile finishing industry. Thus, a maximum water dilutability of the concentrates employed is of utmost importance. For this reason, the poor water compatibility or low water stability of sols known from the literature is another aspect why sols have not been applied to date in the textile finishing industry.

As alcohol-based sols are diluted with water to reach the textile application concentrations, the formulations have a high tendency to hydrolysis and condensation. The liquors become turbid after a short time, and in some cases a metal oxide will precipitate as a solid. Such unstable systems are not suitable for use as finishing agents for uniform application to the textile. If it is attempted to remove the alcohol released by the hydrolysis, for example, by distillation, for increasing the flash point, the sols are destabilized, and a water-insoluble gel forms, which clearly complicates further processing or makes it impossible. Concentrated sols for the formulation of coating systems for textile application must be readily dilutable with water, must not have a low flash point and must be stable in aqueous baths and application liquors throughout the finishing process.

US 2004/0117915 A1 describes a multifunctional nanoscale surface treatment for textiles. In this process, a metal oxide matrix is applied for improving the surface properties. It is noted that the textile and the nanosol formulation must be anhydrous during the application.

DE 19756906 A1 claims coating agents for textile and polymeric materials. The coating agent is prepared from three components, a) a film-forming organosol, b) an aluminum or zirconium halide, and a cross-linking compound having at least two hydroxy groups, which are storage-stable as such, but are mixed only immediately before the coating and have a very limited stability as a mixture.

DE 19816136 A1 describes nanostructured molded parts and layers and the preparation thereof via stable water-soluble precursors. Aqueous colloidal suspensions are coated with reactive monomeric or oligomeric components. Thus, aqueous sols, such as boehmite, $TiO_2$, $ZrO_2$ or $SiO_2$ sols, can be reacted to obtain clear solutions that are stable over an extended period of time after concentration and optionally dispersion of the liquid residue in water, the stripping of the solvent being required for the stabilization of the system. The reactive components described are various silanes with which the sols are reacted. The silicon-oxygen bonds formed thereby are insufficiently fast to washing due to their low alkali stability. The thus prepared systems are applied to glasses, plastics and metals for optical purposes.

DE 10063519 A1 describes low-solvent sol-gel systems obtainable by a) the hydrolysis or condensation of a silane, alkoxide or several alkoxides of different main group or subgroup elements and b) the addition of water until phase separation occurs, and c) separation of the condensate phase. The water-insoluble condensate phase can be taken up again in water only by using a dispersing aid, and the resulting dispersion is employed as a binder for various substrates.

EP 1 252 214 B1 relates to an organometallic composition comprising a complex of at feast one orthoester of a metal with the formula $M(ROAcAc)_x(OR')_y$, wherein (a) M is selected from the group consisting of titanium, zirconium and hafnium;
(b) ROAcAc represents an ester of an alcohol ROH, wherein R is a (optionally substituted) $C_{1-30}$ cyclic, branched or linear alkyl, alkenyl, aryl or alkylaryl group or a mixture thereof, with acetoacetic acid;
(c) OR' is the residue of an alcohol R'OH, wherein R' is a (optionally substituted) $C_{7-30}$ cyclic, branched or linear alkyl, alkenyl, aryl or alkylaryl group or a mixture thereof; and
(d) x and y are each within a range of from 1 to 3, and x+y=4; with the proviso that, when M is zirconium, R' is not a $C_{7-6}$ alkyl or alkoxyalkyl group.

WO 03/093383 A1 describes substrates provided with a biofilm-inhibiting coating of an inorganic condensate modified with organic groups, wherein at least part of the organic groups of the condensate has fluorine atoms, and copper or silver colloids are contained in the coating.

It is the object of the present invention to provide stable concentrated inorganic/organic sols that are readily dilutable with water to form coating agents, especially for textile materials, without using dispersing aids, in particular wherein the removal of the low boiling alcohols results in the concentrate having a flash point of at least 65° C., especially at least 100° C. It is a further object of the present invention to provide, in particular, textile materials with coatings applied thereto that have a clearly improved washproofness, wherein the finished textiles are subject to less damage from laundering.

In a first embodiment, the above object is achieved by a process for the preparation of sol-based water-dilutable concentrates by mixing the following components:

(A) from 0.5 to 25% by weight of an organosol obtainable by the hydrolysis and condensation of one or more trialkoxysilanes and/or dialkoxysilanes of general formula I $$R_{4-x}Si(OR')_x \quad (I)$$

wherein
R represents the same or different optionally substituted hydrocarbon groups with from 1 to 22 carbon atoms which are bonded to the silicon atom through a carbon atom, optionally interrupted by oxygen, sulfur, nitrogen or the group NR'', with R'' being hydrogen or $C_1$ to $C_{14}$ alkyl;
the radicals R' are the same or different and each represent an optionally substituted hydrocarbon group with from 1 to 8 carbon atoms, optionally interrupted by oxygen, sulfur, nitrogen or the group NR'' with the meaning mentioned above; and
x is 2 or 3;

(B) from 4 to 55% by weight of one or more alkoxides of general formula II $$Me(OR')_n \quad (II)$$

wherein
Me represents Ti, Zr, Hf or Al, n is the valence of the metal cation, and R' has the meaning mentioned above;
(C) from 0.1 to 15% by weight of one or more complexing agents for reducing the hydrolysis rate of components (A) and (B); and
(D) from 5 to 95% by weight of a water-compatible or water-miscible solvent having a boiling point of at feast 150° C.;
respectively based on 100% by weight of components (A), (B), (C) and (D);
wherein the reaction is optionally followed by removing by distillation the alcohol formed in the hydrolysis to adjust the flash point.

The above mentioned organosol can be obtained by the per se known hydrolysis and condensation of the alkoxysilane, especially without the presence of dispersing aids.

For example, it is possible to admix a corresponding alkoxysilane with an aqueous acidic solution to obtain a corresponding hydrolysate, especially a clear one.

Examples of radicals R in the above formula include linear and/or branched alkyl, alkenyl, aryl, alkylaryl, arylalkyl, arylalkenyl, alkenylaryl radicals (preferably each having from 1 to 22, especially from 1 to 16, carbon atoms, including cyclic forms) which may be interrupted by oxygen, sulfur, nitrogen atoms or the group NR'' (R'' being hydrogen or $C_{1-14}$ alkyl) and may bear one or more substituents selected from the group consisting of halogens and optionally substituted amino, amide, carboxy, mercapto, isocyanato, hydroxy, alkoxy, alkoxycarbonyl, acryloxy, methacryloxy, epoxy or perfluorinated alkyl groups.

More preferably, the above alkoxysilanes of general formula (I) include at least one in which at least one radical R bears a group capable of undergoing a polyaddition (including polymerization) or polycondensation reaction.

The above group capable of undergoing a polyaddition or polycondensation reaction is preferably an epoxy group or (preferably activated) carbon-carbon multiple bonds (especially double bonds), wherein a (meth)acrylate group is a particularly preferred example of the latter groups.

Accordingly, particularly preferred organically modified alkoxysilanes of general formula (I) for use in the present invention are those in which x=3 and a radical (the only radical) R represents ω-glycidyloxy-$C_{2-6}$-alkyl or ω-(meth)acryloxy-$C_{2-6}$-alkyl.

Concrete examples of such alkoxysilanes include 3-glycidoxypropyltri(m)ethoxysilane, 3,4-epoxybutyltrimethoxysilane and 2-(3,4-epoxycyclohexyl)ethyltrimethoxysilane and 3-(meth)acryloxypropyltri(m)ethoxysilane and 2-(meth)acryloxyethyltri(m)ethoxysilane. Other examples of suitable compounds with x=1 or 2 include 3-glycidoxypropyldimethyl(m)ethoxysilane, 3-glycidoxypropyl methyldi(m)ethoxysilane, 3-(meth)acryloxypropylmethyldi(m)ethoxysilane and 2-(meth)acryloxyethylmethyldi(m)ethoxysilane.

Other alkoxysilanes which may preferably be employed in combination with alkoxysilanes bearing the above groups capable of undergoing a polyaddition or polycondensation reaction include, for example, tetramethoxysilane, tetraethoxysilane, tetra-n-propoxysilane, tetra-n-butoxysilane, hexadecyltrimethoxysilane, cyclohexyltrimethoxysilane, cyclopentyltrimethoxysilane, ethyltrimethoxysilane, phenylethyltrimethoxysilane, phenyltrimethoxysilane, n-propyltrimethoxysilane, cyclohexylmethyldimethoxysilane, dimethyldimethoxysilane, diisopropyldimethoxysilane, phenylmethyldimethoxysilane, phenylethyltriethoxysilane, phenyltriethoxysilane, phenylmethyldiethoxysilane and phenyldimethylethoxysilane. The mentioned organically modified alkoxysilanes may also be employed as such.

Further, if at least one alkoxide of general formula (II) is then added to the hydrolysate in the course of the reaction, a first reaction already occurs.

The alkoxides employed according to the invention (component B) of general formula (II) are highly reactive, so that components (A) and (B) would hydrolyze very quickly upon contact with water in absence of complexing agent (C).

However, according to the invention, it is not required to employ the reactive alkoxides directly in a complexed form. Rather, it is possible to add the complexing agent or agents briefly after the start of the reaction of components (A) and (B).

Concrete examples of such compounds include aluminum sec-butylate, titanium isopropoxide, titanium propoxide, titanium butoxide, zirconium isopropoxide, zirconium propoxide, zirconium butoxide, zirconium ethoxide.

However, especially for the more reactive alkoxides (for example, of Al, Ti, Zr etc.), it may be recommendable to employ them directly in a complexed form, examples of suitable complexing agents including saturated and unsaturated carboxylic acids and β-dicarbonyl compounds, such as acetic acid, lactic acid, methacrylic acid, acetylacetone and acetoacetic acid ethyl ester. Also suitable are ethanolamines and alkyl phosphates, such as tri-, diethanolamine and butyl phosphate.

Concrete examples of such complexed alkoxides include titanium acetylacetonates, titanium bis(ethylacetoacetates), triethanolamine titanates, triethanolamine zirconates or zirconium diethylcitrates.

The complexing agent (C), especially a chelating compound, causes some complexing of the metal cation, so that the hydrolysis rate of components (A) and (B) is reduced.

As a further component, the water-dilutable concentrate according to the invention comprises a water-compatible or water-miscible solvent having a boiling point of at least 150° C.

For example, diethylene glycol or triethylene glycol may be employed. Further, for example, butyldiglycol, propylene glycols, butylene glycols, polyethylene glycols may be used as component (D), The purpose of the high-boiling solvents is, in particular, that an improved stability of the concentrates according to the invention can be achieved as a compensation for the low molecular weight alcohol released during the hydrolysis.

In a preferred embodiment of the present invention, the concentrate is characterized in that components (A) and (B) together are in a concentration of at least 20% by weight, based on 100% by weight of components (A), (B), (C) and (D), and that the weight ratio of component (A) to component (B) is within a range of from 1:1 to 1:100. If the total amount of components (A) and (B) in the concentrates according to the invention is too low, uniformly covering coatings on a wide variety of substrates can be prepared only with great difficulty. Since component (B) also serves as a cross-linking agent for the alkoxysilanes of components (A), these should be present in the concentrates according to the invention at least in equimolar amounts, based on component (A). Accordingly, within the meaning of the present invention, it is particularly preferred if the weight ratio of component (A) to component (B) is within a range of from 1:1 to 1:100.

For the purpose of the above mentioned object, a concentrate is particularly preferred if components (A) and (B) together are in a concentration of at least 30% by weight, based on 100% by weight of components (A), (B), (C) and (D), and the weight ratio of component (A) to component (B) is within a range of from 1:1 to 1:25.

In a further preferred embodiment of the present invention, the concentrate is characterized in that component (A) is an organosol obtainable by the hydrolysis of alkoxysilanes of general formula I, especially trialkoxysilanes and/or dialkoxysilanes, optionally dissolved in organic solvents, wherein R represents the same or different optionally branched hydrocarbon groups bonded to the silicon atom through a carbon atom and interrupted by oxygen, sulfur, nitrogen or the group NR", with R" being hydrogen or $C_1$ to $C_6$ alkyl, and may bear one or more substituents selected from the group consisting of halogens and optionally substituted amino, amido, carboxy, mercapto, isocyanate, acryloxy, methacryloxy or epoxy groups, with a diluted inorganic or organic acid.

Component (B) to be employed according to the invention may be employed neat or in the form of an alkoxide dissolved in a solvent. In this respect, it is particularly preferred for component (B) to contain up to 50% by weight of organic solvent, for example, methanol, ethanol, n-propanol, isopropanol, butanol.

Generally, according to the present invention, it is particularly preferred for component (C) to comprise carbonyl compounds, alkyl phosphates, polyethylene, -propylene, -butylene glycols, polytri-, -diamines and/or ethanolamines.

Even more preferably, the carbonyl compound is selected from 1,3-dicarbonyl compounds.

For unproblematic application in textile plants, the low boiling alcohol formed during the hydrolysis can be removed by distillation for increasing the flash point of the concentrate according to the invention, especially to temperatures above 65° C., especially above 100° C., without adversely affecting the product properties. The removal of the low boiling components from the reaction system is preferably effected at elevated temperature or under reduced pressure, preferably at elevated temperature and under reduced pressure, the temperature being from 50° C. to 200° C., preferably from 80° C. to 170° C., more preferably from 130° C. to 150° C. Usually, a pressure of from 20 to 900 mbar, preferably from 50 to 250 mbar, is applied.

As the limit of the flash point of the concentrate, a temperature is selected which does not require an "R10" (flammable) labeling under either the Hazardous Material Regulation (European Agreement Concerning the International Carriage of Dangerous Goods by Road, ADR) or Hazardous Substances Legislation (Handling and Use Regulation, Directive 67/548 EEC). Products having a flash point of >65° C. must not be labeled according to either Handling and Use Regulation or Transport Regulation, and thus, the use thereof in non-explosion-proof plants is to be considered unproblematic.

For the preparation of a transparent storage-stable coating agent from the above mentioned, especially transparent, homophase concentrates, the latter are diluted with water at a weight ratio of from 100:1 to 1:500.

Another embodiment of the present invention is the use of the coating agent according to the invention for the treatment of organic and inorganic fibers and textiles from aqueous baths and application liquors by spraying, casting, flow coating, dipping, centrifuging, padding, rolling or printing.

The concentrate according to the invention or the coating agent usually does not serve as an active substance on the inorganic fibers and textiles, but needs to be combined with other textile treatment agents. In particular, the concentrates according to the invention and/or the coating agents are employed in combination with finishing agents and/or with suspensions or dispersions of organic and/or inorganic particles and/or sols to produce functionalities, more preferably in combination with hydrophilic, hydrophobic, UV-protecting, flame-retardant and/or antimicrobial finishing agents.

In addition, it is also possible by means of the present invention to employ organic and inorganic fibers and textiles in combination with suspensions or dispersions of organic and/or inorganic particles and/or sols.

For the condensation of components (A) and (B), it is required to expose the substrates provided with the coating agent according to the invention to an elevated temperature. On the one hand, the elevated temperature serves to complete the hydrolysis and condensation reaction, and in addition, it also serves for the more or less complete removal of the solvent. Accordingly, it is particularly preferred according to the present invention to dry the treated textile materials at a temperature within a range of from 60° C. to 250° C. in the course of 10 seconds up to 10 hours.

In addition to textile materials, according to the present invention, it is similarly possible to provide other substrates with the coating agents according to the invention. Therefore, it is particularly preferred according to the present invention to coat substrates made of wood, paper, leather, glass, metal and/or polymeric plastics.

Another embodiment of the present invention naturally includes the above defined coating agent to be dried onto the surface of the material after the application.

EXAMPLES

Prehydrolysate 1:
234.34 g (1 mol) of 3-glycidyloxypropyltrimethoxysilane was admixed with 15.3 g of 0.1 N (0.85 mol of $H_2O$) aqueous HCl solution with stirring. The mixture, which became clear quickly, was stirred at room temperature for 2 hours to obtain a colorless clear hydrolysate.

Prehydrolysate 2:
278.34 g (1 mol) of 3-glycidyloxypropyltriethoxysilane was admixed with 15.3 g of 0.1 N (0.85 mol of $H_2O$) aqueous HCl solution with stirring. The mixture, which became clear quickly, was stirred at room temperature for 2 hours to obtain a colorless clear hydrolysate.

Prehydrolysate 3:
192 g (1 mol) of 3-aminopropylmethyldiethoxysilane was admixed with 13.5 g of 0.1 N (0.75 mol of $H_2O$) aqueous HCl solution with stirring. The mixture, which became clear quickly, was stirred at room temperature for 2 hours to obtain a colorless clear hydrolysate.

Preparation Protocol 1 (According to the Invention)
For a formulation yielding 300 g of sol, component A) was charged in a beaker at room temperature, and component B) was added with stirring. Subsequently, the mixture was stirred for 30 minutes. Thereupon, component C) was added slowly. A slight exotherm could be observed. After another 30 minutes of stirring, component D) was added. The clear yellow solution was further stirred for 30 minutes. Subsequently, the mixture was distilled by means of a rotary evaporator at 150° C. and 200 mbar until a flash point of >65° C. was reached. The viscous clear orange-red solution was slowly cooled down to room temperature. The fractional weight percentages of the respective components, of the distillate and the flash point of the resulting sol can be seen from Table 1.

Preparation Protocol 2 (According to the Invention)
For a formulation yielding 300 g of sol, component A) was charged in a three-necked flask with a reflux condenser at room temperature, and component B) was added with stirring. Subsequently, the mixture was stirred for 30 minutes. Thereupon, component C) was added slowly. A slight exotherm could be observed. After another 30 minutes of stirring, component D) was added. The clear yellow mixture was now stirred under reflux at 80° C. for 5 hours. Subsequently, the mixture was distilled by means of a rotary evaporator at 150° C. and 200 mbar until a flash point of >65° C. was reached. The viscous clear orange-red solution was slowly cooled down to room temperature. The fractional weight percentages of the respective components, of the distillate and the flash point of the resulting sol can be seen from Table 1.

Preparation Protocol 3 (According to the Invention)
For a formulation yielding 300 g of sol, component D) was charged in a three-necked flask with a reflux condenser at room temperature, and component C) was added with stirring. Subsequently, the mixture was stirred for 30 minutes. Thereupon, components B) and A) were added slowly. A slight exotherm could be observed. The clear yellow mixture was now stirred under reflux at 80° C. for 5 hours. Subsequently, the mixture was distilled by means of a rotary evaporator at 150° C. and 200 mbar until a flash point of >65° C. was reached. The viscous clear orange-red solution was slowly cooled down to room temperature. The fractional weight percentages of the respective components, of the distillate and the flash point of the resulting sol can be seen from Table 1.

Preparation Protocol for a Silver-Containing Finishing Agent According to DE 1037399 A1:
16.064 g of a 5% aqueous silver nitrate solution was admixed with 3.235 g of 2-aminoethyl-3-aminopropyltriethoxysilane dropwise with stirring at room temperature. The spontaneous darkening of the solution due to the formation of silver oxide particles was reverted by further adding the nitrogen-containing component, so that a transparent solution resulted with the reaction solution being slightly heated.

TABLE 1

| | Component A | | | Component B | | Component C | | |
| --- | --- | --- | --- | --- | --- | --- | --- | --- |
| Sol No. | Prehydrolysate 1 % by weight | Prehydrolysate 2 % by weight | Prehydrolysate 3 % by weight | Zirconium tetrapropanolate 70% in n-propanol | Tetraisopropyl titanate % by weight | Acetylacetone % by weight | Diethanolamine % by weight | Triethanolamine % by weight |
| Sol 1 | 1.8 | | | 8.2 | | 1.7 | | |
| Sol 2 | | 1.1 | | 5.0 | | 1.0 | | |
| Sol 3 | | 1.9 | | 8.3 | | 1.7 | | |
| Sol 4 | | 4.4 | | 14.1 | | 1.5 | | |
| Sol 5 | | 10.3 | | 32.9 | | 6.9 | | |
| Sol 6 | | 11.0 | | 35.2 | | 3.8 | | |
| Sol 7 | 11.0 | | | 35.2 | | 3.8 | | |
| Sol 8 | | 11.0 | | 35.2 | | 3.8 | | |
| Sol 9 | | 11.0 | | 35.3 | | 3.8 | | |
| Sol 10 | | 11.0 | | 35.3 | | | | 5.6 |
| Sol 11 | | 11.0 | | 35.3 | | | | |
| Sol 12 | | 11.0 | | 35.3 | | | | |
| Sol 13 | | 11.0 | | 35.3 | | | | |
| Sol 14 | | | | 35.3 | | | | |
| Sol 15 | | 11.3 | | 36.3 | | 2.3 | | |
| Sol 16 | | 12.8 | | | 24.9 | 4.4 | | |
| Sol 17 | | 14.5 | | | 28.3 | 7.2 | | |
| Sol 18 | | 14.5 | | | 28.3 | 7.2 | | |
| Sol 19 | | | 11.0 | 35.3 | | | 3.9 | |

TABLE 1-continued

| | | Component C | | Component D | | | | | |
|---|---|---|---|---|---|---|---|---|---|
| | Sol No. | Glacial acetic acid % by weight | Tartaric acid diethyl ester % by weight | Diethylene glycol % by weight | Triethylene glycol % by weight | % by weight component A + component B | Distillate % by weight | Flash point ° C. | Preparation protocol |
| | Sol 1 | | | 88.3 | | 10.0 | 5.8 | >100 | 1 |
| | Sol 2 | | | | 92.9 | 6.1 | 3.8 | >100 | 1 |
| | Sol 3 | | | 88.2 | | 10.1 | 5.6 | 90.1 | 2 |
| | Sol 4 | | | 80.0 | | 18.5 | 10.9 | 85.2 | 1 |
| | Sol 5 | | | 50.0 | | 43.1 | 27.3 | 76.2 | 1 |
| | Sol 6 | | | 50.0 | | 46.2 | 27.7 | 67.3 | 1 |
| | Sol 7 | | | 50.0 | | 46.2 | 28.0 | 88.3 | 1 |
| | Sol 8 | | | 50.0 | | 46.2 | 27.6 | 67.1 | 3 |
| | Sol 9 | | | 45.0 | 5.0 | 46.3 | 26.4 | 95.4 | 2 |
| | Sol 10 | | | 48.1 | | 46.3 | 27.6 | 92.3 | 1 |
| | Sol 11 | 9.1 | | 44.7 | | 46.3 | 26.2 | 65.3 | 1 |
| | Sol 12 | | 7.8 | 45.9 | | 46.3 | 28.4 | 70.3 | 1 |
| | Sol 13 | 4.5 | | 49.2 | | 46.3 | 27.6 | 94.7 | 2 |
| | Sol 14 | 4.5 | | 49.2 | | 46.3 | 24.9 | 81.5 | 1 |
| | Sol 15 | | | 50.1 | | 47.6 | 28.6 | 66.2 | 3 |
| | Sol 16 | | | 58.0 | | 37.6 | 21.4 | 71.3 | 1 |
| | Sol 17 | | | | 50.0 | 42.8 | 24.6 | 96.4 | 2 |
| | Sol 18 | | | | 50.0 | 42.8 | 23.9 | 96.1 | 3 |
| | Sol 19 | | | 49.8 | | 46.3 | 28.5 | 73.6 | 1 |

Determination of the Flash Point:

The flash point was determined by analogy with the standard DIN EN 22719.

Preparation of a Coating Liquor:

In a beaker, 200 g of demineralized water was adjusted to pH 5.5 with acetic acid, and a sol according to Table I was added slowly with stirring to form a colorless to yellowish transparent solution. In Table 2, the compositions of the coating liquors employed (B0 to B21) are described.

TABLE 2

| Coating liquor | Sol No. | Amount of sol employed in g | Amount of silver-containing finishing agent employed in g | Amount of softener component employed in g |
|---|---|---|---|---|
| B0 | — | 0.0 | 0.2 | |
| B1 | Sol 1 | 46.1 | 0.2 | |
| B2 | Sol 2 | 75.5 | 0.2 | |
| B3 | Sol 3 | 46.1 | 0.2 | |
| B4 | Sol 4 | 25.0 | 0.2 | 5.0 |
| B5 | Sol 5 | 10.7 | 0.2 | |
| B6 | Sol 6 | 10.0 | 0.2 | |
| B7 | Sol 7 | 10.0 | 0.2 | 5.0 |
| B8 | Sol 8 | 10.0 | 0.2 | |
| B9 | Sol 9 | 10.0 | 0.2 | |
| B10 | Sol 10 | 10.0 | 0.2 | |
| B11 | Sol 11 | 10.0 | 0.2 | |
| B12 | Sol 12 | 10.0 | 0.2 | |
| B13 | Sol 13 | 10.0 | 0.2 | |
| B14 | Sol 14 | 10.0 | 0.2 | 5.0 |
| B15 | Sol 15 | 9.7 | 0.2 | |
| B16 | Sol 16 | 12.3 | 0.2 | |
| B17 | Sol 17 | 10.8 | 0.2 | 5.0 |
| B18 | Sol 18 | 10.8 | 0.2 | |
| B19 | Sol 19 | 10.0 | 0.2 | |
| B20 | — | 0.0 | 0.0 | 5.0 |
| B21 | — | 0.0 | 0.0 | |

Textile Finishing:

A sample of a cotton-polyester mixed fabric (35%/65%) with dimensions of 20×30 cm and a fabric weight of 210 g/m² was finished with a coating liquor according to Table II by means of a padder, squeezed to 60% liquor uptake and dried at 120° C. for 2 min, followed by condensation at 150° C. for one minute.

Household Laundering:

The finished samples were washed by analogy with the standard EN ISO 6330. Thus, an Electrolux FOM 71 CLS washing machine of type A, front loading, with a horizontally rotating drum and a perborate-free detergent (ECE-2) were employed. The washing was effected at 40° C. as a normal wash. In order to observe the required laundry weight of 2 kg, the washing drum was filled up with an accompanying polyester fabric.

Washproofness:

The washproofness of the coating agent and its permanent fixing properties were tested by determining the concentrations of various metals on the finished samples (P1 to P20) as compared to an non-finished sample (P21) and a sample (P0) treated only with the silver-containing finishing agent.

The metal atoms zirconium and titanium employed in the respective coating agents and the precious metal silver, which was fixed onto the samples in a washproof way by means of the coating agent through the added finishing agent, were particularly suitable for that purpose.

All samples (P0 to P21) were subjected to 40 household laundering operations, wherein the samples were withdrawn and dried after one, 20 and 40 washes, and the metal contents according to DIN 38406E22 were determined. The established values are stated in Table 3.

TABLE 3

| Sample | finished with coating liquor | Ag content before washing in ppm | Ag content after one wash in ppm | Ag content after 20 washes in ppm | Ag content after 40 washes in ppm | Zr content before washing in ppm | Zr content after one wash in ppm |
|---|---|---|---|---|---|---|---|
| P0 | B0 | 23.2 | 1.2 | <0.1 | <0.1 | | |
| P1 | B1 | 20.1 | 9.8 | 7.7 | 5.4 | | |
| P2 | B2 | 24.1 | 7.5 | 3.2 | 2.1 | | |

TABLE 3-continued

| Sample | | | | | | |
|---|---|---|---|---|---|---|
| P3 | B3 | 22.8 | 9.3 | 3.2 | 3.1 | 2048 | 1992 |
| P4 | B4 | 16.4 | 6.2 | 4.8 | 3.2 | | |
| P5 | B5 | 19.6 | 9.5 | 8.1 | 6.3 | | |
| P6 | B6 | 21.9 | 14.2 | 3.1 | 0.9 | 2060 | 1576 |
| P7 | B7 | 22.3 | 11.5 | 4.2 | 2.8 | | |
| P8 | B8 | 18.4 | 7.3 | 3.2 | 2.1 | 2183 | 1758 |
| P9 | B9 | 22.1 | 7.1 | 3.2 | 2.5 | | |
| P10 | B10 | 23.5 | 16.4 | 8.4 | 6.2 | | |
| P11 | B11 | 17.2 | 6.5 | 3.7 | 2.4 | | |
| P12 | B12 | 18.7 | 9.3 | 9.1 | 8.7 | | |
| P13 | B13 | 19.5 | 6.5 | 4.2 | 3.2 | 1948 | 1875 |
| P14 | B14 | 18.3 | 7.8 | 5.7 | 4.1 | | |
| P15 | B15 | 19.4 | 7.9 | 6.8 | 6.2 | | |
| P16 | B16 | 22.6 | 13.6 | 8.4 | 7.5 | | |
| P17 | B17 | 20.2 | 9.5 | 5.2 | 5.1 | | |
| P18 | B18 | 20.3 | 9.1 | 4.1 | 1.1 | | |
| P19 | B19 | 20.9 | 11.3 | 8.2 | 7.8 | | |
| P20 | B20 | | | | | | |
| P21 | B21 | | | | | 7.3 | 51.3 |

| Sample | Zr content after 20 washes in ppm | Zr content after 40 washes in ppm | Ti content before washing in ppm | Ti content after one wash in ppm | Ti content after 20 washes in ppm | Ti content after 40 washes in ppm |
|---|---|---|---|---|---|---|
| P0 | | | | | | |
| P1 | | | | | | |
| P2 | | | | | | |
| P3 | 1276 | 1024 | | | | |
| P4 | | | | | | |
| P5 | | | | | | |
| P6 | 935 | 872 | | | | |
| P7 | | | | | | |
| P8 | 957 | 938 | | | | |
| P9 | | | | | | |
| P10 | | | | | | |
| P11 | | | | | | |
| P12 | | | | | | |
| P13 | 1523 | 1406 | | | | |
| P14 | | | | | | |
| P15 | | | | | | |
| P16 | | | 1943 | 1764 | 1335 | 1225 |
| P17 | | | | | | |
| P18 | | | 1898 | 1823 | 1286 | 1199 |
| P19 | | | | | | |
| P20 | | | | | | |
| P21 | 29.1 | 16.1 | 32.1 | 84.7 | 52.9 | 48.2 |

Soft Touch:

To the coating liquors B4, B7, B14 and B17, 25 g per liter of Tubingal® SMF, a silicone-containing microemulsion of the CHT R. Beitlich GmbH, was added as a textile softener component. The correspondingly finished samples were tested for their soft touch before and after the household laundering against the samples P20 and P21, wherein P20 was finished only with the softener component, and P21 was untreated.

Table 4 shows the evaluation of the touch rating; for this rating, an experienced team was assembled who rate the anonymized touch samples by means of a hand test. The samples were rated before and after the household washing, wherein the following rating scheme was used:

+++ very soft touch
++ soft touch
+ poor soft touch effects
o no soft touch effects
– hardened touch.

TABLE 4

| Sample | Finished with coating liquor | before washing | after one wash | after 20 washes | after 40 washes |
|---|---|---|---|---|---|
| P4 | B4 | +++ | +++ | ++ | ++ |
| P7 | B7 | +++ | +++ | ++ | + |
| P14 | B14 | +++ | +++ | ++ | + |
| P17 | B17 | +++ | +++ | ++ | + |
| P20 | B20 | +++ | ++ | o | — |
| P21 | B21 | o | — | — | — |

The invention claimed is:

1. A process for the preparation of sol-based water-dilutable concentrates by mixing the following components:
(A) from 0.5 to 25% by weight of an organosol obtainable by the hydrolysis and condensation of one or more trialkoxysilanes and/or dialkoxysilanes of general formula I $$R_{4-x}Si(OR')_x \quad (I)$$

wherein
R represents the same or different optionally substituted hydrocarbon groups with from 1 to 22 carbon atoms which are bonded to the silicon atom through a carbon atom, optionally interrupted by oxygen, sulfur, nitrogen or the group NR", with R" being hydrogen or $C_1$ to $C_{14}$ alkyl;
the radicals R' are the same or different and each represent an optionally substituted hydrocarbon group with from 1 to 8 carbon atoms, optionally interrupted by oxygen, sulfur, nitrogen or the group NR'' with the meaning mentioned above; and x is 2 or 3;

(B) from 4 to 55% by weight of one or more alkoxides of general formula II $$Me(OR')_n \qquad (II)$$

wherein

Me represents Ti, Zr, Hf or Al, n is the valence of the metal cation, and R' has the meaning mentioned above;

(C) from 0.1 to 15% by weight of one or more complexing agents for reducing the hydrolysis rate of components (A) and (B); and (D) from 5 to 95% by weight of a water-compatible or water-miscible solvent having a boiling point of at least 150° C.;

respectively based on 100% by weight of components (A), (B), (C) and (D), followed by removing alcohols having a boiling point of up to 150° C. are removed by distillation to adjust the flash point, and water is optionally added.

2. The process according to claim 1, characterized in that components (A) and (B) are charged together in a concentration of at least 20% by weight, based on 100% by weight of components (A), (B), (C) and (D), and the weight ratio of component (A) to component (B) is adjusted within a range of from 1:1 to 1:100.

3. The process according to claim 1, characterized in that components (A) and (B) are charged together in a concentration of at least 30% by weight, based on 100% by weight of components (A), (B), (C) and (D), and the weight ratio of component (A) to component (B) is adjusted within a range of from 1:1 to 1:25.

4. The process according to claim 1, characterized in that component (A) is an organosol obtainable by the hydrolysis of trialkoxysilanes and/or dialkoxysilanes, optionally dissolved in organic solvents, wherein R represents one or more substituents selected from the group consisting of halogens and optionally substituted amino, amido, carboxy, mercapto, isocyanato, hydroxy, acryloxy, methacryloxy, epoxy or perfluorinated alkyl groups, with a diluted inorganic or organic acid.

5. The process according to claim 1, characterized in that component (B) contains up to 50% by weight of organic solvent.

6. The process according to claim 1, characterized in that component (C) comprises carbonyl compounds, polyethylene, -propylene, -butylene glycols, polytri-, -diamines and/or ethanolamines as well as alkyl phosphates.

7. The process according to claim 6, characterized in that said carbonyl compound is selected from 1,3-dicarbonyl compounds.

8. The process according to claim 1, characterized in that component (D) comprises a water-soluble solvent in an amount of from 5 to 85% by weight.

9. A transparent storage-stable coating agent containing a concentrate obtainable according to claim 1 and water at a weight ratio of from 100:1 to 1:500.

10. The coating agent according to claim 9 having a flash point of at least 100° C.

11. A process for the treatment of organic and inorganic fibers and textiles from aqueous baths comprising applying the coating agent according to claim 9 on said fibers and textiles by spraying, casting, flow coating, dipping, centrifuging, padding, rolling or printing.

12. The process of claim 11 further comprising the application of finishing agents and/or with suspensions or dispersions of organic and/or inorganic particles and/or sols to produce functionalities, especially in combination with hydrophilic, hydrophobic, UV-protecting, flame-retardant and/or antimicrobial finishing agents.

13. A process for the treatment of organic and inorganic fibers and textiles comprising applying the coating agent according to claim 9 in combination with suspensions or dispersions of organic and/or inorganic particles and/or sols.

14. The process according to claim 11, wherein the treated fibers and textiles are dried at a temperature within a range of from 60° C. to 250° C. in the course of 10 seconds up to 10 hours.

15. A process for the treatment of substrates made of wood, paper, leather, glass, metals and/or polymeric plastics, comprising applying the coating agent according to claim 9.

* * * * *